(12) United States Patent
Maier

(10) Patent No.: US 11,060,495 B2
(45) Date of Patent: Jul. 13, 2021

(54) SEALING ENCLOSURE FOR A STARTER OF AN INTERNAL COMBUSTION ENGINE, AND FASTENING ARRANGEMENT OF A LEAD ON SUCH A STARTER

(71) Applicant: Bayerische Motoren Werke Aktiengesellschaft, Munich (DE)

(72) Inventor: Christian Maier, Vilsbiburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 86 days.

(21) Appl. No.: 16/270,823

(22) Filed: Feb. 8, 2019

(65) Prior Publication Data
US 2019/0170107 A1 Jun. 6, 2019

Related U.S. Application Data

(63) Continuation of application No. PCT/EP2017/070413, filed on Aug. 11, 2017.

(30) Foreign Application Priority Data

Sep. 6, 2016 (DE) ...................... 10 2016 216 908.4

(51) Int. Cl.
*F02N 15/00* (2006.01)
*F02N 11/04* (2006.01)
(Continued)

(52) U.S. Cl.
CPC ............ *F02N 15/006* (2013.01); *F02N 11/04* (2013.01); *H02K 5/10* (2013.01); *H02K 5/225* (2013.01)

(58) Field of Classification Search
CPC ......... F02N 11/04; F02N 15/006; H02K 5/10; H02K 5/132; H02K 5/225; H02K 15/0068

See application file for complete search history.

(56) References Cited

U.S. PATENT DOCUMENTS 6,372,993 B1 * 4/2002 Eckels ................ H01R 13/521
174/152 GM
2008/0048454 A1 2/2008 Kurasawa et al.
(Continued)

FOREIGN PATENT DOCUMENTS

CN 2916881 Y 6/2007
CN 202190171 U 4/2012
(Continued)

OTHER PUBLICATIONS

JP 2008-206379, machine translation. (Year: 2008).*
(Continued)

*Primary Examiner* — Hung Q Nguyen
*Assistant Examiner* — Mark L. Greene
(74) *Attorney, Agent, or Firm* — Crowell & Morning LLP

(57) ABSTRACT

A sealing enclosure for a starter, which can be connected to at least one lead for transmitting electric power, for starting an internal combustion engine of a motor vehicle, having at least one enclosure element with a receiving area in which at least one first contact of the starter and at least one second contact of the lead that is different from the starter, is provided in addition to the starter, and runs at least partly outside of the starter can be received. A first opening opens into the receiving area and via which the first contact can be plugged into the receiving area. A second opening opens into the receiving area and via which the second contact can be plugged into the receiving area in order to electrically connect the first contact to the second contact. The sealing enclosure also has a sealing device by which the receiving area is to be sealed in a water-tight manner, thereby sealing the openings in a water-tight manner.

14 Claims, 3 Drawing Sheets

(51) Int. Cl.
*H02K 5/22* (2006.01)
*H02K 5/10* (2006.01)

(56) References Cited

U.S. PATENT DOCUMENTS

| | | | |
|---|---|---|---|
| 2008/0122564 A1 | 5/2008 | Utsunomiya et al. | |
| 2012/0025657 A1* | 2/2012 | Shinosaka | H02K 5/225 310/159 |
| 2012/0090910 A1 | 4/2012 | Lang | |

FOREIGN PATENT DOCUMENTS

| | | |
|---|---|---|
| CN | 103061610 A | 4/2013 |
| CN | 103065111 A | 4/2013 |
| CN | 204068507 U | 12/2014 |
| CN | 204156651 U | 2/2015 |
| DE | 195 04 375 A1 | 8/1996 |
| DE | 10 2007 033 131 A1 | 1/2008 |
| DE | 10 2007 053 753 A1 | 7/2008 |
| JP | 2006-307757 A | 11/2006 |
| JP | 2007-252104 A | 9/2007 |
| JP | 2008-106686 A | 5/2008 |
| JP | 2008206379 A * | 9/2008 |
| JP | 2009-254128 A | 10/2009 |
| JP | 2012007495 A * | 1/2012 |

OTHER PUBLICATIONS

JP 2012-7495, machine translation. (Year: 2012).*
International Search Report (PCT/ISA/210) issued in PCT Application No. PCT/EP2017/070413 dated Oct. 30, 2017 with English translation (four (4) pages).
German Search Report issued in counterpart German Application No. 10 2016 216 908.4 dated Jan. 17, 2017 with partial English translation (nine (9) pages).
Chinese-language Office Action issued in Chinese Application No. 201780032943.4 dated Mar. 23, 2020 with English translation (18 pages).

* cited by examiner

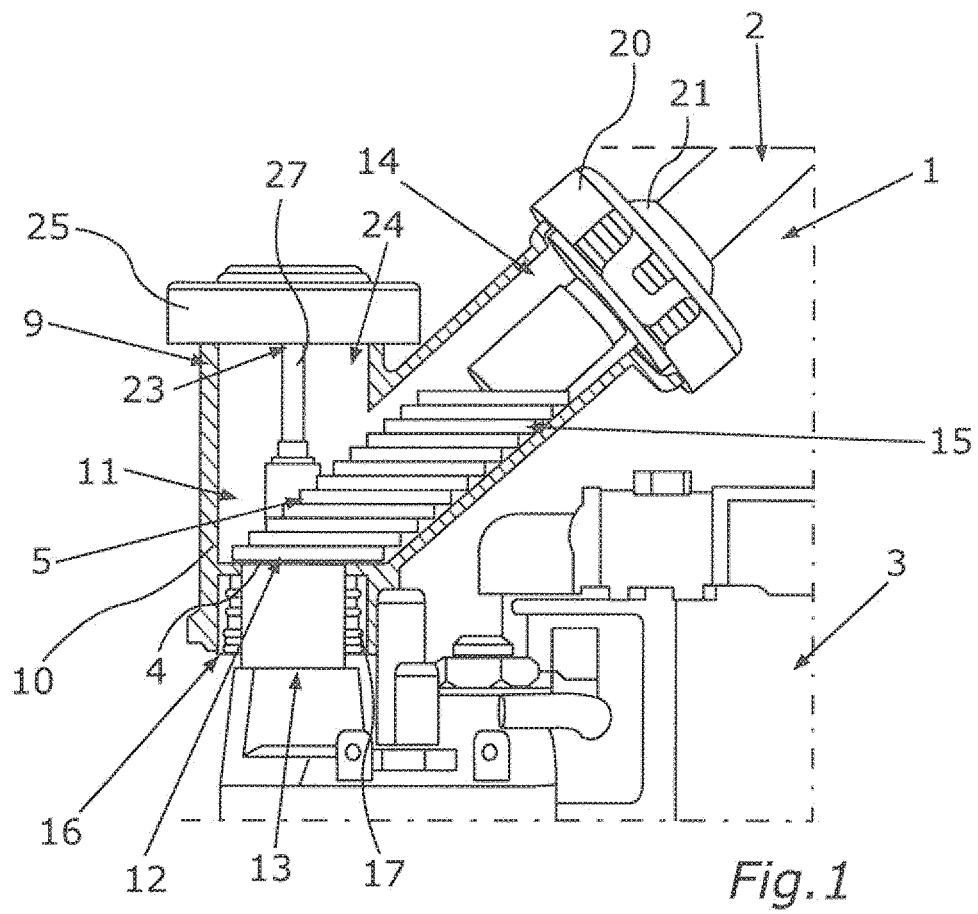
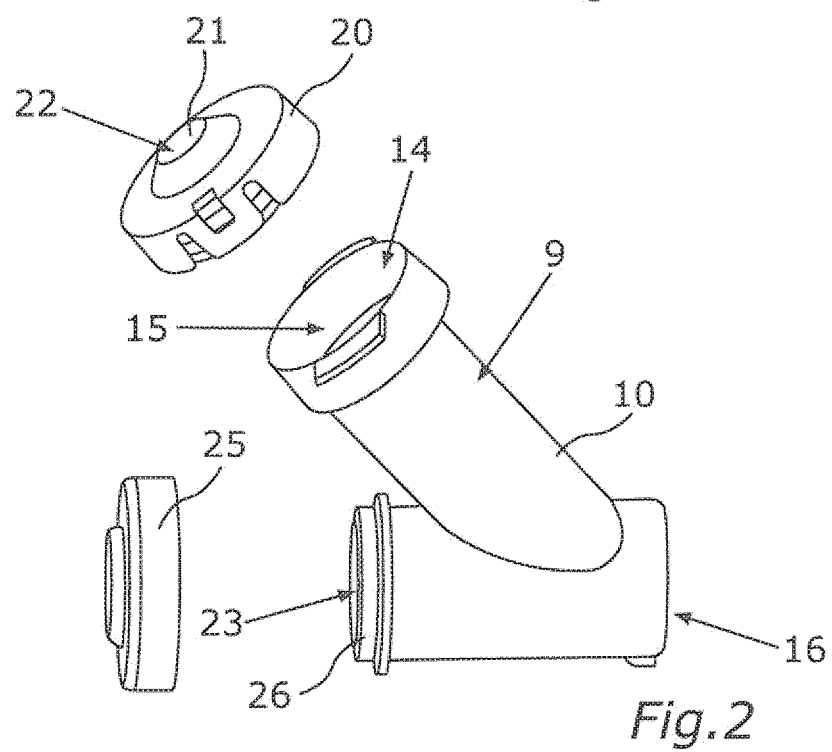

SEALING ENCLOSURE FOR A STARTER OF AN INTERNAL COMBUSTION ENGINE, AND FASTENING ARRANGEMENT OF A LEAD ON SUCH A STARTER

CROSS REFERENCE TO RELATED APPLICATIONS

This application is a continuation of PCT International Application No. PCT/EP2017/070413, filed Aug. 11, 2017, which claims priority under 35 U.S.C. § 119 from German Patent Application No. 10 2016 216 908.4, filed Sep. 6, 2016, the entire disclosures of which are herein expressly incorporated by reference.

BACKGROUND AND SUMMARY OF THE INVENTION

The invention relates to a sealing enclosure for a starter for starting an internal combustion engine for a motor vehicle, and to a fastening arrangement of a lead on a starter for starting an internal combustion engine.

Such fastening arrangements of leads for transmitting electric current to respective starters for starting a respective internal combustion engine for motor vehicles are already sufficiently known from the general prior art, and in particular from series vehicle production. In the case of such a fastening arrangement, the respective starter is electrically connected to the lead via at least one first contact element of the starter and at least one second contact element of the respective lead, such that, for example, electric current, or electrical energy, can be transmitted to the starter, or carried to the starter via the lead, or alternatively electric current, or electrical energy, can be carried from the starter via the lead. The lead in this case is a lead that is different from and provided in addition to the starter. In other words, the lead is a component of the vehicle that is different from the starter and provided in addition to the starter, the lead running at least partly, in particular at least predominantly, outside of the starter. The lead is thus not an electrical element of the starter.

The object of the present invention is to create a sealing enclosure and a fastening arrangement, of the type stated at the outset, such that a particularly advantageous transmission of electric current can be realized in a particularly simple manner.

This object is achieved according to the invention by a sealing enclosure and by a fastening arrangement in accordance with embodiments of the invention.

A first aspect of the invention relates to a sealing enclosure for a starter, for starting an internal combustion engine for a motor vehicle, that can be connected to at least one lead for the purpose of transmitting electric current, or electrical energy. The starter is also usually referred to as a starter motor, and used, in a manner that is sufficiently well known, to start an internal combustion engine. The lead in this case is a lead that is different from the starter and provided in addition to the starter, and that runs at least partly, in particular at least predominantly, outside of the starter, in particular outside of an enclosure of the starter. In other words, the lead is a component of the motor vehicle that is different from the starter and provided in addition to the starter, such that the lead is not an element, or electrical element, of the starter. By way of the electric lead, for example, electric current, or electrical energy, can be transmitted to the starter, or carried to the starter. Alternatively or additionally, it is contemplated for electrical energy, or electric current, to be carried away from the starter by way of the electric lead, or via the electric lead.

The sealing enclosure comprises at least one enclosure element that has a receiving space. At least one first contact element of the starter and at least one second contact element of the lead can be received in the receiving space. Unlike the lead, the first electrical contact element is an element of the starter. The second contact element is a part, or element, of the lead.

The enclosure element additionally has a first opening, which leads into the receiving space, and via which the first contact element can be inserted into the receiving space. The enclosure element additionally has a second opening, which leads into the receiving space, and via which the second contact element can be inserted into the receiving space, in order thereby to electrically connect the first contact element to the second contact element in the receiving space. The second opening is an opening that is different from the first opening and provided in addition to the first opening, the openings being, for example, spaced apart from each other. For this purpose, for example, at least one wall of the enclosure element is arranged between the openings, such that the openings are separated from each other, for example, by means of the wall. The sealing enclosure additionally comprises a sealing device, by means of which the receiving space can be sealed, or is sealed, in a watertight manner by watertight sealing of the openings. In other words, the sealing device is designed to seal the openings and the receiving space in a watertight manner. This means that at least the openings can be sealed by means of the sealing device, in order thereby to seal the receiving space in a watertight manner. This watertight sealing, or sealability, of the receiving space makes it possible to prevent moisture, or water, from entering the receiving space and thus advancing to the contact elements arranged in the receiving space, such that excessive exposure of the contact elements to water or moisture can easily be avoided.

The invention in this case is based on the recognition that, in the case of conventional internal combustion engines, a watertight connection of the lead on the starter, also referred to as the starter lead, is not provided. Usually provided is a screwed connection, by which the lead is connected to the starter, in order thereby to electrically and mechanically connect the lead to the starter. Usually, no protection of the screwed connection is provided, such that the screwed connection is usually not sealed in a watertight manner. It was found in this case that, in the case of high water load, the screwed connection can become heavily corroded, such that the screwed connection can fail. As a result, the lead can become detached from the starter. It is thus usually necessary to protect the screwed connection by supplemental manual greasing, with grease being applied manually to the contact elements after the lead has been connected to the starter. The process of greasing cannot be monitored, or can be monitored only with a large amount of effort, and therefore cannot ensure an adequate protection against corrosion.

These problems and disadvantages can be avoided by means of the sealing enclosure according to the invention, since, by means of the enclosure, the contact elements can be protected in an effective and simple manner against excessive exposure to moisture, or water.

The sealing enclosure according to the invention makes it possible to realize a sealable, or sealed, connection geometry for joining the lead to the starter, in particular for electrically connecting the lead to the starter.

The sealing enclosure is preferably realized as a component that is separate from the starter and provided in addition to the starter, the sealing enclosure being able to be connected to the starter, for example, in a reversibly detachable manner. It is preferably provided in this case that the sealing enclosure is included in a supply package of the lead, such that the lead and the sealing enclosure form, for example, one supply package, or one sub-assembly unit. In the case of the sub-assembly unit, the sealing enclosure is held, for example, on the lead, such that, for example in the course of the manufacture of the internal combustion engine, the lead is delivered to an assembly belt for manufacturing the internal combustion engine, in a state in which the sealing enclosure is held on the lead. Thus, by means of the sealing enclosure, the lead can be connected to the starter in a particularly simple, time-efficient and inexpensive manner, and in particular joined to the starter in a watertight manner. Consequently, an additional manual greasing of the contact elements can be avoided. By means of the sealing enclosure, it is possible to realize a watertight connection between the starter and the lead, which is held on the starter, for example, by way of at least one screwed connection. Owing to the fact that, by contrast with conventional internal combustion engines, there is no need for additional greasing to be performed manually, there is no additional resource requirement for mounting, or fitting, the lead.

In an advantageous design of the invention, the sealing device has at least one first sealing element for sealing the first opening. Ingress of an excessive quantity of water, or moisture, into the receiving space can thus be reliably avoided.

In order in this case to seal the receiving space in a particularly effective and particularly simple manner, it is provided, in a further embodiment of the invention, that the first sealing element is composed of a plastic and injection-molded onto the enclosure element of the sealing enclosure. For this purpose, for example, the first sealing element is injection-molded onto the enclosure element in the course of a plastic injection molding process.

It has been found to be particularly advantageous in this case if the sealing element is composed of a first plastic, and the enclosure element is composed of a second plastic that is different from the first plastic. In this way, the sealing enclosure can be manufactured particularly easily, and thus in a time-efficient and inexpensive manner. The enclosure element and the first sealing element in this case form a two-component injection-molded part (2C injection-molded part), the two-component injection-molded part being produced, in the course of an injection molding process, from the mutually differing plastics. To realize a particularly advantageous sealing effect, it is preferably provided that the first plastic is softer than the second plastic.

To realize a particularly simple mounting of the lead, in a further embodiment of the invention a cover is provided, which is realized such that it is separate from the enclosure element and can be connected, in particular in a reversibly detachable manner, to the enclosure element, and by which the second opening can be at least partly closed. The reversibly detachable connection, or connectability, is to be understood to mean that the cover can be connected to the enclosure element and detached from the enclosure element, without damage being incurred by the cover or the enclosure element.

A further embodiment is characterized in that the sealing device comprises at least one second sealing element, held on the cover, for sealing the second opening. The second opening can thereby be sealed particularly effectively.

In the case of a particularly advantageous embodiment of the invention, the cover has a feedthrough opening for the lead. The lead can thus extend from outside of the enclosure element, through the feedthrough opening into the enclosure element, and thus into the receiving space, such that the sealing enclosure can be mounted on the lead in a particularly simple manner, or vice versa.

In order to seal the receiving space in a particularly effective manner in this case, the second sealing element is designed to seal the lead against the cover, and to seal the cover against the enclosure element. Water can thereby be prevented from flowing, through the feedthrough opening, between the cover and the lead. In addition, water can be prevented from flowing through between the cover and the enclosure element, such that it is possible to avoid the contact elements, which can be arranged or are arranged in the receiving space, being excessively exposed to water, or moisture.

In order to join the lead to the starter in a particularly simple manner, and thereby electrically connect it to the starter, in a further design of the invention it is provided that the enclosure element has a third opening, which leads into the receiving space and via which at least one fastening element, for fastening the first contact element to the second contact element, and/or for fastening the sealing enclosure to the starter, can be inserted into the receiving space. The third opening is, for example, an opening that is different from the first and second opening and provided in addition to the first and second opening, and that is, for example, spaced apart from, or separate from, the first or second opening. For this purpose, for example, a respective wall, or a respective wall region, is arranged between the third opening and the first and second opening.

It has been found to be particularly advantageous in this case if a second cover is provided, which is realized such that it is separate from the enclosure element and can be connected, in particular in a reversibly detachable manner, to the enclosure element, and by which the third opening can be at least partly closed.

In addition, preferably, a third sealing element is provided, by which the second cover is sealed, or can be sealed, against the enclosure element. In this case, for example, the statements made concerning the first sealing element are applicable to the third sealing element and vice versa.

It is thus provided, for example, that the third sealing element is composed of a plastic and injection-molded onto the enclosure element of the sealing enclosure. In particular, it is contemplated for the third sealing element to be composed of a third plastic that is different from the second plastic. In this case, for example, the third plastic is the first plastic, such that the first sealing element and the third sealing element may be composed of the same plastic. In this case, for example, the first sealing element and the third sealing element are made from the same plastic, in a common plastic injection-molding process, such that the third sealing element is likewise a component part of the two-component injection-molded part. In particular, it is contemplated for the first sealing element and the third sealing element to be realized so as to be integral with each other.

A second aspect of the invention relates to a fastening arrangement of a lead for transmitting electric current, or electrical energy, to a starter for starting an internal combustion engine for a motor vehicle. In the case of the fastening arrangement, the starter is electrically connected to the lead via at least one first contact element of the starter and at least one second contact element of the lead, which is different from the starter and is provided in addition to the starter and which runs at least partly, in particular at least predominantly or entirely, outside of the starter.

In order then to realize a particularly advantageous transmission of electric current, or electrical energy, between the lead, also referred to as the starter lead, and the starter, provided according to the invention is a sealing enclosure, having at least one enclosure element, which has a receiving space in which the contact elements are received. The enclosure element additionally has a first opening, which leads into the receiving space and via which the first contact element is inserted into the receiving space. Furthermore, the enclosure element has a second opening, which leads into the receiving space and via which the second contact element, electrically connected in the receiving space to the first contact element, is inserted into the receiving space. The sealing enclosure additionally has a sealing device, by means of which the receiving space is sealed in a watertight manner by watertight sealing of the openings. Advantages and advantageous designs of the first aspect of the invention are to be considered as advantages and advantageous designs of the second aspect of the invention, and vice versa.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a schematic and partly cut-away view of a fastening arrangement of a lead for transmitting electric current to a starter for starting an internal combustion engine for a motor vehicle.

FIG. 2 is a schematic exploded view of a sealing enclosure of the fastening arrangement.

In the figures, elements that are the same or that have the same function are denoted by the same references.

DETAILED DESCRIPTION OF THE DRAWINGS

Figure 3:
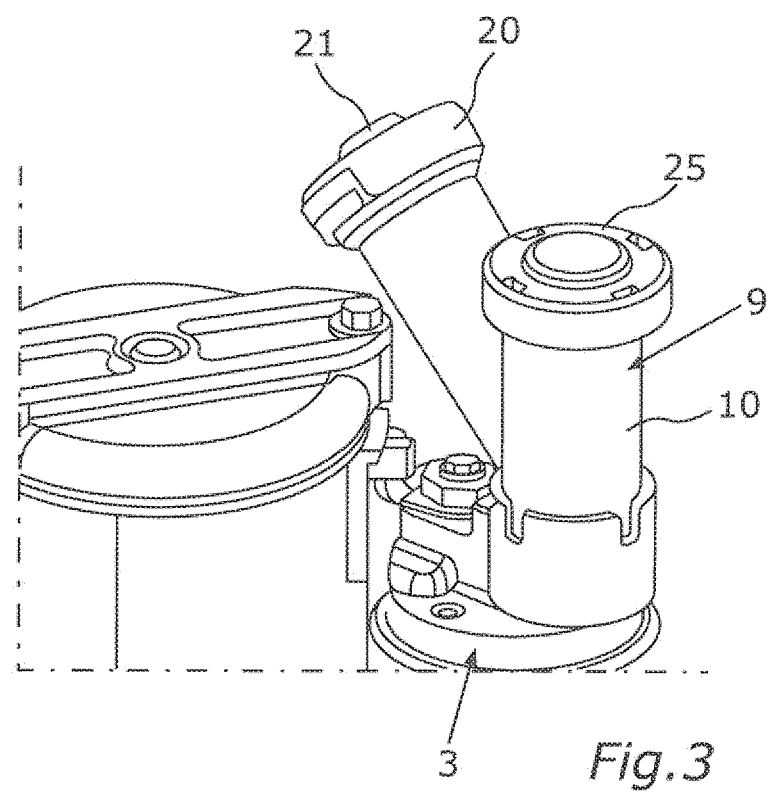
FIG. 3 is a schematic perspective view of an arrangement of the sealing enclosure on the starter.
Figure 4:
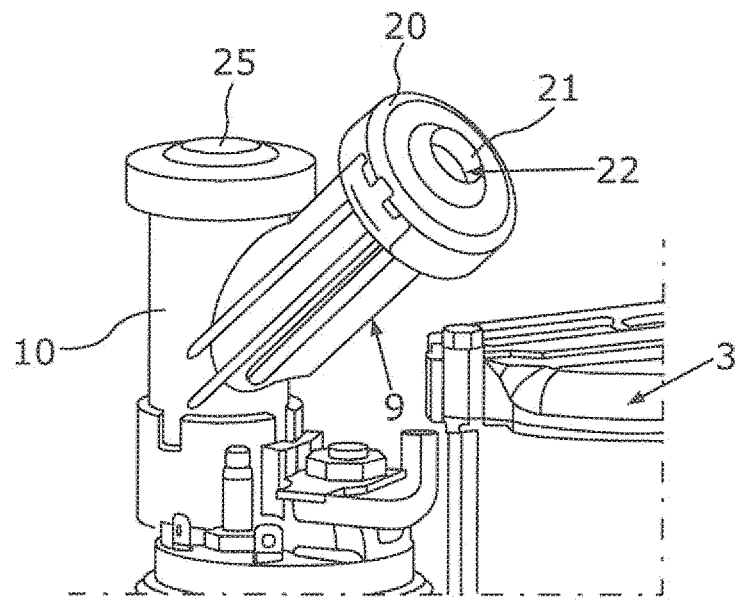
FIG. 4 is a further schematic perspective view of the arrangement according to FIG. 3.
Figure 5:
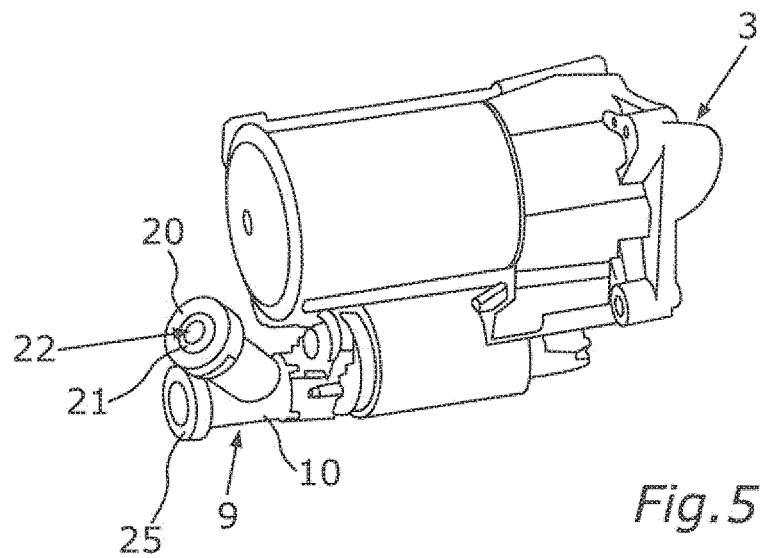
FIG. 5 is a schematic perspective view of the arrangement according to FIGS. 3 and 4.

Shown in part in FIG. 1, in a schematic and partly cut-away side view, is a fastening arrangement 1 of a lead 2 for transmitting electric current, or electrical energy, to a starter 3, which can be seen in part in FIG. 1 and particularly clearly from FIG. 5, for starting an internal combustion engine for a motor vehicle. The motor vehicle is realized, for example, as a car, in particular as a passenger car, and can be driven by means of the internal combustion engine. The starter 3 is also referred to as the starter motor, by means of which the initially deactivated internal combustion engine can be activated, i.e. started. For this purpose, the starter 3 has an electric machine, for example that is realized as an electric motor or that can be operated as an electric motor, by which, for example, an output shaft of the internal combustion engine that is realized as a crankshaft can be accelerated to a starting rotational speed. From attainment of the starting rotational speed onwards, the output shaft is driven, for example, by internal combustion processes, which take place in at least one combustion chamber of the internal combustion engine that is realized, for example, as a cylinder.

In the case of the fastening arrangement 1, the starter 3 is electrically connected via, or by means of, the lead 2, for example, to at least one further component of the motor vehicle that is different from the starter 3 and from the lead 2, and that is provided in addition thereto, such that, for example, electrical energy, or electric current, can be transmitted from the further component to the starter 3 and/or from the starter 3 to the further component via, or by means of, the lead 2. The further component is, for example, an energy storage device for storing electrical energy, the energy storage device being realized, for example, as a battery. In order to start the internal combustion engine, the starter 3, in particular the electric motor, is supplied with electrical energy from the battery, the electrical energy for operating the starter 3 being able to be transmitted from the battery to the starter 3 via the lead 2.

Alternatively or additionally, the electric machine of the starter 3 can be operated as a generator, by which, for example, mechanical energy can be converted into electrical energy. The generator may provide the electrical energy, which can then, for example, be transferred from the generator to the battery via the lead 2, and stored in the battery. As explained in greater detail in the following, in the case of the fastening arrangement 1 a watertight joint of the lead 2 to the starter 3 is provided, such that the lead 2 is electrically connected to the starter 3 in a watertight manner.

Figure 7:
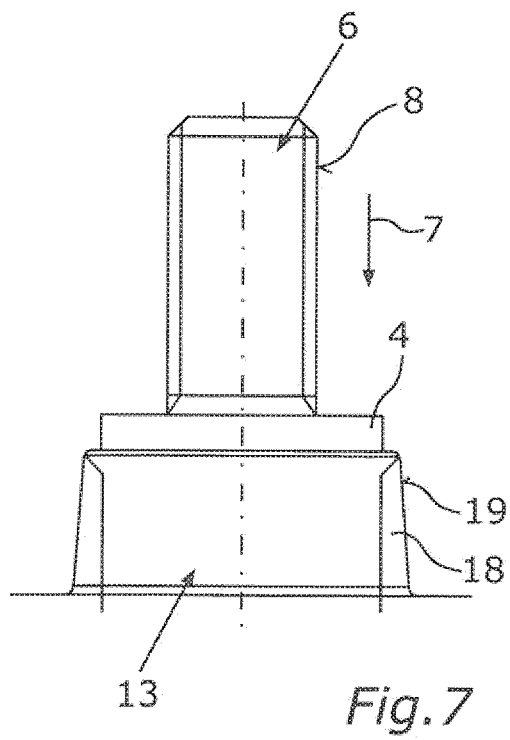
FIG. 7 is a schematic side view of the starter.

For this purpose, the starter 3 includes at least one first contact element 4, which can be seen particularly clearly in FIG. 7. The lead 2 additionally includes at least one second contact element 5, realized as a cable lug, which can be electrically connected, or is electrically connected within the scope of the fastening arrangement 1, to the contact element 4. By means of this electrical connection of the contact elements 4 and 5, the lead 2 is electrically connected to the starter 3, such that electrical energy can be transmitted, via the contact elements 4 and 5, between the starter 3 and the lead 2.

The contact element 5 realized, for example, as a cable lug, has a feedthrough opening, not visible in the figures, through which, for example, a pin element 6 of the starter 3, which can be seen in FIG. 7, is inserted. The contact element 4 adjoins the pin element 6 in the direction of the longitudinal extent of the pin element 6. For example, the pin element 6 is inserted through the feedthrough opening until the contact element 5 comes into contact with the contact element 4, as a result of which the contact elements 4 and 5 are electrically contacted to each other.

In this case, the contact element 5 is put onto the pin element 6, in an insertion direction indicated by an arrow 7 in FIG. 7, in order to insert the pin element 6 through the feedthrough opening of the cable lug. The insertion direction in this case points in the direction of the contact element 4 and runs parallel to the direction of longitudinal extent of the pin element 6.

In order to fasten, or fix, the contact element 5 to the contact element 4, such that the electrical contact between the contact elements 4 and 5 is not broken in an unwanted manner, a fastening element, not represented in the figures, is used, which is realized, for example, as a nut. The nut has a first thread in the form of an internal thread. The pin element 6 has a second thread, in the form of an external thread 8, that corresponds to the internal thread. The pin element 6 in this case is joined to the contact element 4 contrary to the insertion direction. When the contact element 5 has been put onto the pin element 6, and the contact element 5 is in contact with the contact element 4, the nut is screwed onto the pin element 6 by means of its internal thread and the external thread 8. By rotation of the nut relative to the pin element 6, the relative rotation between the nut and the pin element 6 is converted, by means of the threads, into a translational relative movement between the nut and the pin element 6. In the course of this translational relative movement, the nut is moved, along the insertion direction, onto the contact element 5 placed onto the pin element 6, and thus onto the contact element 4. The nut in this case comes to be supported, at least indirectly, against the contact element 5 arranged between the contact element 4 and the nut. If the nut is then fastened, or tightened, the contact element 5 placed onto the pin element 6 is tensioned against the contact element 4, such that the contact element 5 is clamped between the contact element 4 and the nut, by means of the latter. A screwed connection is thereby formed, by which the contact element 5 is mechanically fastened to the contact element 4 and held in electrical contact with the contact element 4.

In order then to realize a particularly advantageous transmission of electrical energy in a particularly simple manner, a sealing enclosure 9, which can be seen particularly clearly in FIGS. 2 to 5, is provided in the case of the fastening arrangement 1. As explained in yet greater detail in the following, the said screwed connection can be sealed in a watertight manner by the sealing enclosure 9, in order thereby to avoid the screwed connection being excessively exposed to water or moisture.

For this purpose, the sealing enclosure 9 comprises a preferably integrally realized enclosure element 10, which has a receiving space 11 that can be seen particularly clearly in FIG. 1. In the case of the fastening arrangement 1, the contact elements 4 and 5 are arranged in the receiving space 11 and electrically and mechanically connected to each other in the receiving space 11. In addition, it can also be seen particularly clearly from FIG. 1 that the lead 2 is a lead that is different from the starter 3 and provided in addition to the starter 3. In other words, the lead 2 is an element of the motor vehicle that is different from the starter 3 and provided in addition to the starter 3, the lead 2 running at least partly, in particular at least predominantly or entirely, outside of the starter 3. The lead 2 is thus not an electrical component part of the starter 3.

Figure 6:
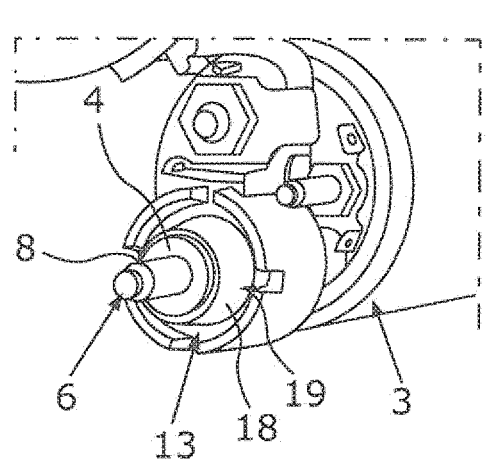
FIG. 6 is a schematic perspective view of the starter.

The enclosure element 10 has a first opening 12, which leads into the receiving space 11 and via which the first contact element 4 and the pin element 6, and thus the external thread 8, is inserted into the receiving space 11. For example, the contact element 4 and the pin element 6 are inserted into the receiving space 11, via the first opening 12, in such a manner that the enclosure element 10 is put onto the pin element 6 and the contact element 4. The pin element 6, and thus the external thread 8 and the contact element 4, are thus constituent parts of a joint 13 of the starter 3 that can be seen particularly clearly in FIGS. 6 and 7, the starter 3 being able to be both mechanically and electrically connected to the lead 2 via the joint 13, or by means of the joint 13. The enclosure element 10 in this case is placed onto the joint 13, such that the pin element 6 and the contact element 4 are inserted into the receiving space 11.

The enclosure element 10 additionally has a second opening 14, which leads into the receiving space 11 and via which the second contact element 5 can be inserted, or is inserted, into the receiving space 11, in order thereby to electrically connect the contact elements 4 and 5 to each other in the receiving space 11. It can be seen from FIG. 1 that adjoining the second opening 14 is a first channel 15 of the enclosure element 10, such that the lead 2, in particular the contact element 5, is inserted into the channel 15 via the opening 14, and inserted into the receiving space 11 along the channel 15.

Furthermore, the sealing enclosure 9 has a sealing device, denoted as a whole by 16, by which the receiving space 11 can be sealed, or is sealed, in a watertight manner by watertight sealing of the openings 12 and 14. In other words, the sealing device 16 is designed to seal the openings 12 and 14, and the receiving space 11, in a watertight manner, such that the aforementioned screwed connection realized or arranged in the receiving space 11 is protected against excessive exposure to water. A watertight joint of the lead 2 to the starter 3 is thereby created.

The sealing device 16 has a first sealing element 17, which can be seen in FIG. 1, by means of which the first opening 12 can be sealed, or is sealed. In addition, the joint 13 has a cone 18 (see FIGS. 6 and 7), which functions as a sealing cone and corresponds to the sealing element 17, and which adjoins the contact element 4 in the direction of longitudinal extent of the pin element 6, in particular in the insertion direction.

The sealing enclosure 9, in particular the enclosure element 10, may be placed onto the joint 13, and connected to the joint 13, in particular in a reversibly detachable manner. This reversibly detachable connection, or connectability, is to be understood to mean that the sealing enclosure 9, or the enclosure element 10, can be connected to the joint 13, or fastened to the joint 13, and detached from the joint 13 without damage being incurred by the joint 13 or the sealing enclosure 9.

As a result of the enclosure element 10 being placed on the joint 13, the first sealing element 17 comes to act in combination with the cone 18, in particular to be supported against it, such that the first sealing element 17 is supported on an outer circumferential surface 19 of the cone 18. The enclosure element 10 is thereby sealed against the joint 13, or against the cone 18, by means of the sealing element 17, as a result of which the first opening 12 is sealed in a watertight manner.

Preferably, the first sealing element 17 is composed of a plastic, and injection-molded onto the enclosure element 10. It has been found to be particularly advantageous in this case if the first sealing element 17 is composed of a first plastic and the enclosure element 10 is composed of a second plastic that is different from the first plastic. In order to realize a particularly advantageous sealing effect in this case, the first plastic is preferably softer than the second plastic. As a result, the sealing element 17 can fit particularly well or sit particularly closely against the cone 18, in particular against the outer circumferential surface thereof 19, such that the opening 12 is particularly well sealed.

Preferably, the enclosure element 10 is composed of a fiber-reinforced plastic, in particular of a glass-fiber-reinforced plastic such as, for example, PA6 GF15. Thus, for example, the second plastic is glass-fiber-reinforced polyamide. Alternatively or additionally, it is provided that the first plastic is TPE (thermoplastic elastomer). The enclosure element 10 and the sealing element 17 injection-molded onto the enclosure element 10 thus form, for example, a two-component plastic part (2C part), in particular a two-component injection-molded part.

The sealing enclosure 9 has a first cover 20, which is realized such that it is separate from the enclosure element 10 and made, for example, from a plastic, and which preferably can be connected to the enclosure element 10 in a reversibly detachable manner. The second opening 14 can be closed, or in the case of the fastening arrangement 1 is closed, at least partly, in particular at least predominantly, by use of the cover 20. The cover 20 in this case is preferably made from a fiber-reinforced plastic, in particular from a glass-fiber-reinforced plastic such as, for example, PA6 GF15.

The sealing device 16 in this case has a second sealing element 21, held on the cover 20, for sealing the second opening 14 in a watertight manner. It is preferably provided in this case that the second sealing element 21 is composed of a plastic and injection-molded on the cover 20. For example, the cover 20 is composed of a third plastic, and the sealing element 21 of a fourth plastic that is different from the third plastic, the fourth plastic preferably being softer than the third plastic. In this case, the third plastic may correspond to the second plastic, and the fourth plastic may correspond to the first plastic. Thus, the fourth plastic may be, for example, TPE. Thus, for example, the cover 20 and the second sealing element 21 form a two-component plastic part (2C plastic part).

The sealing element 21 may particularly advantageously sit closely against the cover 20 and/or against the enclosure element 10, such that, particularly advantageously, the cover 20 can be sealed, or is sealed, against the enclosure element 10 by means of the sealing element 21.

It can be seen particularly clearly from FIG. 2 that the cover 20 and the sealing element 21 have respective feed-through openings 22 for the lead 2, which are arranged such that they overlap mutually. When the fastening arrangement 1 is in the finished manufactured state, the lead 2 passes through the feedthrough openings 22, such that the lead 2 extends from outside of the enclosure element 10, through the feedthrough openings 22, into the enclosure element 10, and in this case through the channel 15 into the receiving space 11. The lead 2 in this case is sealed against the cover 20 by means of the sealing element 21, such that no water can pass through between the lead 2 and the sealing element 21, or between the sealing element 21 and the cover 20, into the enclosure element 10.

The enclosure element 10 additionally has a third opening 23, shown particularly clearly in FIG. 1, which leads into the receiving space 11 and adjoining which, for example, is a second channel 24. The sealing enclosure 9 additionally has a second cover 25, which is composed, for example, of a plastic, in particular of a fiber-reinforced plastic. For example, the cover 25 is composed of a glass-fiber-reinforced plastic such as, for example, PA6 GF15. The second cover 25 can be connected, or is connected, to the enclosure element 10 in reversibly detachable manner, such that the third opening 23 can be closed, or is closed, at least partly, in particular at least predominantly or entirely, by means of the second cover 25. In particular, the sealing enclosure 9 has a bayonet closure, by which the cover 25 can be fastened, or is fastened, to the enclosure element 10 in a reversibly detachable manner.

The sealing device 16 in this case has a third sealing element 26, shown particularly clearly in FIG. 2, by which the cover 25 can be sealed, or is sealed, against the enclosure element 10. The third opening 23 can thereby be sealed, or is sealed, in a watertight manner. The third sealing element 26 in this case is held on the enclosure element 10.

The third sealing element 26 is composed, for example, of a fifth plastic, which is different from the second plastic, wherein the fifth plastic may correspond to the first plastic. The sealing element 26 is thus composed, for example, of TPE. Preferably, the sealing element 26 is injection-molded onto the enclosure element 10, wherein it may preferably be provided that the sealing elements 17 and 26 are realized so as to be integral with each other. The sealing elements 17 and 26 are thus, for example, injection-molded onto the enclosure element 10 in a common injection molding process, the sealing elements 17 and 26 being made from the identical or same plastic. A plastic member 27, composed of the first or the fifth plastic, which is realized so as to be integral with the sealing elements 17 and 26, can be seen in FIG. 1. The plastic member 27 is provided for production reasons, for the purpose of injection-molding the sealing elements 17 and 26 onto the enclosure element 10 in a common injection molding process. Thus, for example, the sealing element 26 is a constituent part of the two-component plastic part that comprises the enclosure element 10 and the sealing element 17. Since the two-component plastic part is manufactured by injection molding, the two-component plastic part is realized as a two-component injection-molded part.

It is shown particularly clearly by FIG. 1 that the receiving space 11, and thus the nut that is or can be arranged in the receiving space 11, are accessible via the third opening 23, in particular, when the enclosure element 10 has already been put onto the joint 13, and the lead 2, or the contact element 5 has been put onto the pin element 6. Via the opening 23, the nut can be screwed onto the pin element 6, and in particular screw-connected to the pin element 6 and tightened, or fastened, in order thereby to fix the contact element 5 to the contact element 4 in the manner described. Following fixing of the contact element 5 to the contact element 4, the opening 23 is closed and sealed, in that the cover 25 is fastened to the enclosure element 10.

Since the openings 12, 14 and 23 are sealed by way of the sealing device 16, the receiving space 11 is watertight, such that a watertight joint of the lead 2 on the starter 3 is obtained. The joint 13 is also referred to a "terminal 30", the "terminal 30" being protected by the sealing enclosure 9, in particular by the enclosure element 10 composed of plastic, and thus realized as a plastic enclosure. In particular, by use of the sealing enclosure 9, the joint 13 can be protected against excessive exposure to water, such that excessive corrosion of the joint 13, or of the contact elements 4, and 5, can be avoided.

As a result of the described tightening, or fastening, of the nut on the pin element 6, not only is the contact element 5 fixed to the contact element 4, but the sealing enclosure 9 is also fastened to the starter 3 by means of the nut, i.e. by tightening, or fastening, of the nut on the pin element 6. This is because the nut is supported, via the contact element 5, on the contact element 4, and thus on the starter 3, and is thus tensioned against the starter 3, as a result of which the enclosure element 10, or the sealing enclosure 9, as a whole is tensioned by means of the nut, via the contact element 5, against the starter 3, or against the contact element 4. The sealing enclosure 9, or the enclosure element 10, is thereby securely fixed to the starter 3.

In order to detach the sealing enclosure 9, or the lead 2, from the starter 3 in a particularly simple manner, the cover 25 is, for example, first removed in a non-destructive manner from the enclosure element 10. Via the opening 23 that is then freed, the nut can be detached from the pin element 6, such that it is then possible to detach, or remove, the lead 2 from the pin element 6, or the sealing enclosure 9 from the joint 13, and thus from the starter 3 as a whole.

LIST OF REFERENCES 1 fastening arrangement
2 lead 3 starter
4 first contact element
5 second contact element
6 pin element
7 arrow
8 external thread
9 sealing enclosure
10 enclosure element
11 receiving space
12 first opening
13 joint
14 second opening
15 first channel
16 sealing means
17 first sealing element
18 cone
19 outer circumferential surface
20 first cover
21 second sealing element
22 feedthrough openings
23 third opening
24 second channel
25 second cover
26 third sealing element
27 plastic member The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A sealing enclosure for a starter that is connectable to at least one lead, comprising:
   at least one enclosure element, wherein
      the enclosure element has a receiving space, in which at least one first contact element of the starter and at least one second contact element of the at least one lead, the at least one lead being configured to transmit electric current for starting an internal combustion engine for a motor vehicle, the second contact element being different from the starter and provided in addition to the starter and which runs at least partly outside of the starter, are disposed, the enclosure element has a first opening, which leads into the receiving space and via which the first contact element is insertable into the receiving space,
      the enclosure element has a second opening, which leads into the receiving space and via which, for electrically contacting the first contact element to the second contact element, the second contact element is insertable into the receiving space,
      the enclosure element has a sealing device, by which the receiving space is sealed watertight by watertight sealing of the first and second openings,
      the sealing device has at least one first sealing element configured to seal the first opening, and
      the first sealing element is composed of a plastic and is injection-molded onto the enclosure element of the sealing enclosure.

2. The sealing enclosure as claimed in claim 1, wherein the first sealing element is composed of a first plastic, and the enclosure element is composed of a second plastic that is different from the first plastic.

3. The sealing enclosure as claimed in claim 1, further comprising:
   a cover, which is realized such that the cover is separate from the enclosure element and is connectable in a reversibly detachable manner to the enclosure element, wherein
   the second opening is at least partly closable by the cover.

4. The sealing enclosure as claimed in claim 3, wherein the sealing device comprises at least one second sealing element, held on the cover, for sealing the second opening.

5. The sealing enclosure as claimed in claim 4, wherein the cover has a feedthrough opening for the lead.

6. The sealing enclosure as claimed in claim 5, wherein the second sealing element is designed to seal the lead against the cover, and to seal the cover against the enclosure element.

7. The sealing enclosure as claimed in claim 1, wherein the enclosure element has a third opening, which leads into the receiving space and via which at least one fastening element, for fastening the first contact element to the second contact element, and/or for fastening the sealing enclosure to the starter, is insertable into the receiving space.

8. A fastening arrangement comprising:
   a sealing enclosure, the sealing enclosure comprising at least one enclosure element, wherein the enclosure element has:
   a receiving space in which a first contract element and a second contact element are received,
   a first opening, which leads into the receiving space and via which the first contact element is inserted into the receiving space,
   a second opening, which leads into the receiving space and via which the second contact element, electrically connected in the receiving space to the first contact element, is inserted into the receiving space, and
   a sealing device, by which the receiving space is sealed watertight by watertight sealing of the first and second openings, wherein
      the receiving space is configured to accommodate therein a lead for transmitting electric current to a starter configured to start an internal combustion engine of a motor vehicle, the starter is electrically connected to the lead via at least the first and second contact elements, the second contact element is different from the starter and provided in addition to the starter and which runs at least partly outside of the starter,
      the sealing device has at least one first sealing element configured to seal the first opening, and
      the first sealing element is composed of a plastic and is injection-molded onto the enclosure element of the sealing enclosure.

9. The fastening arrangement as claimed in claim 8, wherein
   the first sealing element is composed of a first plastic, and the enclosure element is composed of a second plastic that is different from the first plastic.

10. The fastening arrangement as claimed in claim 8, wherein
    a cover, which is realized such that the cover is separate from the enclosure element and is connectable in a reversibly detachable manner to the enclosure element, wherein
    the second opening is at least partly closable by the cover.

11. The fastening arrangement as claimed in claim 10, wherein the sealing device comprises at least one second sealing element, held on the cover, for sealing the second opening.

12. The fastening arrangement as claimed in claim 11, wherein
the cover has a feedthrough opening for the lead.

13. The fastening arrangement as claimed in claim 12, wherein
the second sealing element is designed to seal the lead against the cover, and to seal the cover against the enclosure element.

14. The fastening arrangement as claimed in claim 8, wherein
the enclosure element has a third opening, which leads into the receiving space and via which at least one fastening element, for fastening the first contact element to the second contact element, and/or for fastening the sealing enclosure to the starter, is insertable into the receiving space.

\* \* \* \* \*